C. CLARENI.
Revolving-Harrow.
No. 12,659.
2 Sheets—Sheet 1
Patented Apr. 3, 1855.
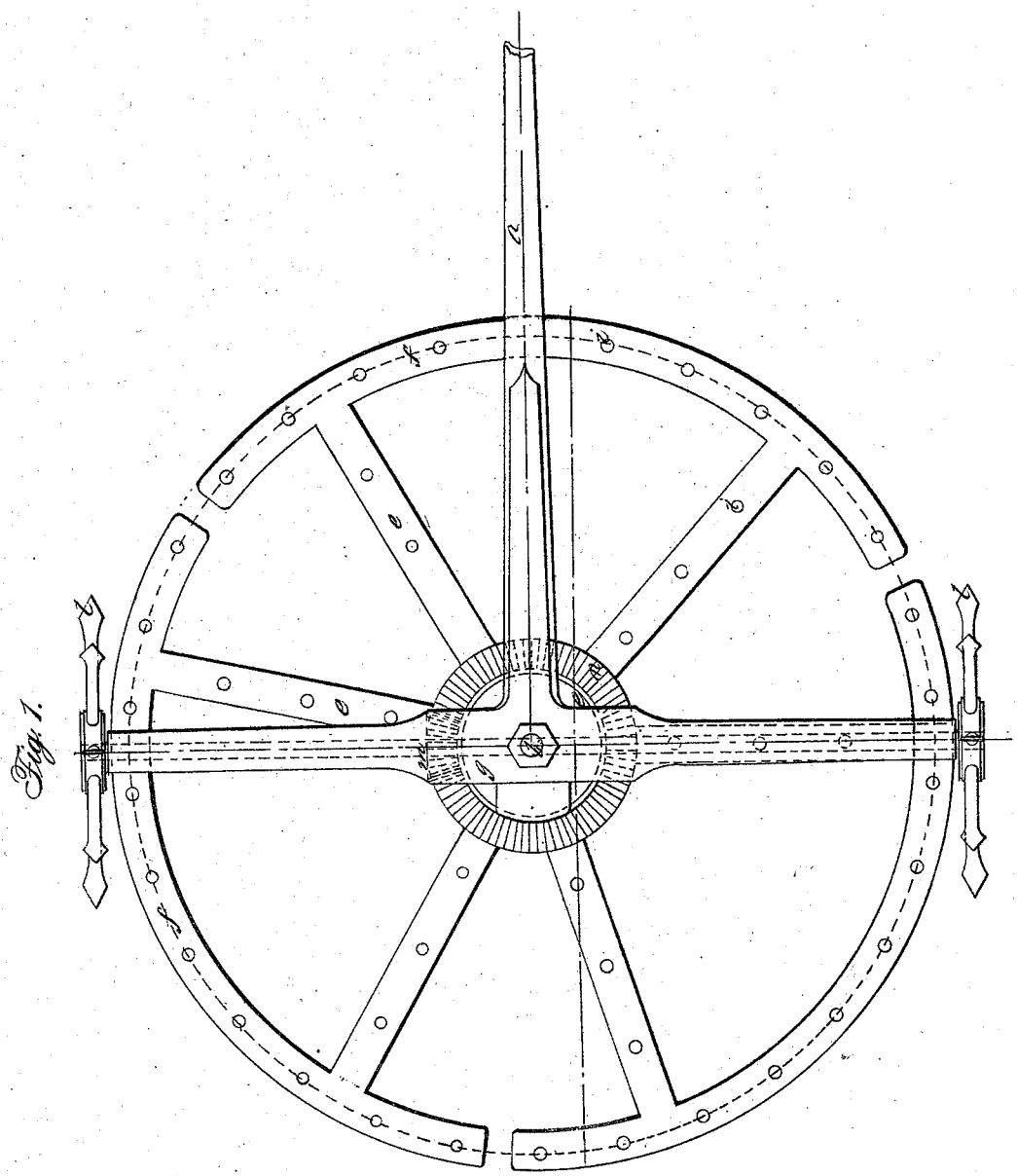
Inventor:
Charles Clareni.

C. CLARENI.
Revolving-Harrow.
No. 12,659.
2 Sheets—Sheet 2
Patented Apr. 3, 1855.
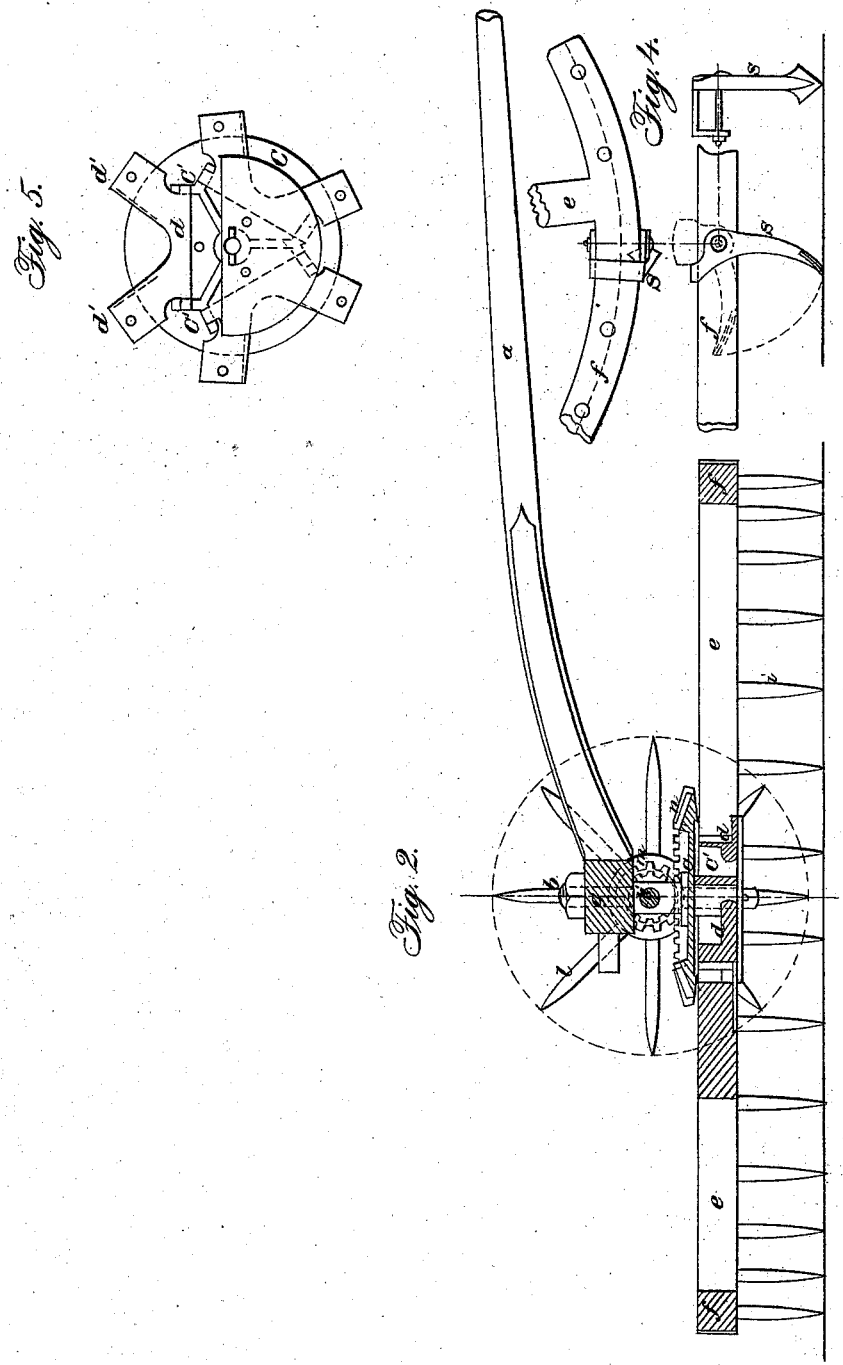
Inventor:
Charles Clareni.

UNITED STATES PATENT OFFICE.

CHARLES CLARENI, OF NEW YORK, N. Y., ASSIGNOR TO C. CLARENI AND GEO. P. FIELD.

IMPROVEMENT IN HARROWS.

Specification forming part of Letters Patent No. 12,659, dated April 3, 1855.

*To all whom it may concern:*

Be it known that I, CHARLES CLARENI, of the city, county, and State of New York, have invented a new and useful Improvement in Harrows, which I denominate the "Horizontal Flexible Self-Rotating Harrow;" and I do hereby declare the following to be a full, clear, and exact description thereof, reference being had to the accompanying drawings, which form a part of the same, in which—

Figure 1 is a plan of the implement. Fig. 2 is a vertical section. Fig. 3 is a plan of the center casting's under side. Fig. 4 is a modification of the rotating apparatus.

The construction of my improved harrow is as follows: I form a pole, $a$, of sufficient length, to which the horses or other animals are hitched to draw the implement. To the rear end of this pole a pivot, $b$, is affixed, on which, below the pole, a circular metal plate, $c$, rotates. This plate (shown detached at Fig. 3) forms the center of the harrow. It has three (more or less) radial flanges projecting from its under side, the outer end of each of which is divided at $c'$, as clearly shown in Fig. 3, so as to form a bearing for the movable section of the harrow to pivot in a casting, $d$, having two radial projections, $d'$ $d'$, upon it, jointed to the center piece. The projections $d'$ have wooden arms $e$ firmly bolted to them, to the outer ends of which a wooden segment, $f$, is affixed, which, together with the arms, is sufficiently stout to support the harrow-teeth $i$, that are inserted in them. The harrow is divided into sections, (three being represented in the drawings,) each being allowed to rise and fall independent of the others to suit themselves to the inequality of the surface over which they are drawn.

To cause the implement thus constructed to revolve as it is drawn forward in a straight line, one modification is to affix to the rear end of the pole and across the center of the harrow a bar, $g$, extending from side to side thereof, and at right angles to the pole this bar supports an axle, $k$, in proper bearing, projecting from its under side. On the ends of the axle $k$, beyond the periphery of the harrow, two sets of spade-like arms, $l$, are affixed, radiating from a hub upon the axle-like spokes of a wheel. These are turned by coming in contact with the ground, and cause the harrow to rotate horizontally by means of a pinion, $m$, on the axle, which gears into a bevel-wheel, $n$, attached to or forming a part of the center casting of the harrow $c$.

Another device, which I deem more simple and important, is to dispense with the cross-bar $g$ and axle $k$, together with the gear-wheel and pinion, and instead thereof to joint to the curved segments $f$ certain movable spades $s$, as shown in Fig. 4, which will fold up toward the segments, as shown by the dotted lines, in one direction, but can only be brought down nearly to a perpendicular line, in the other by reason of a shoulder or cross-piece that strikes against the segment $f$ on its upper or under side. Thus as the harrow is drawn along the spades enter the ground on one side of the circle and hold on, while on the opposite side they are drawn over the surface, folding back for that purpose, by which means the circular harrow or wheel of teeth revolves, causing each tooth to perform a sort of cycloidal movement, by which the ground is more thoroughly stirred up and pulverized and the teeth are freed from clogging.

What I claim is—

1. Making the rotating harrow in flexible segments, as herein described.

2. The movable spades $s$ for rotating the harrow, as herein specified.

CHARLES CLARENI.

Witnesses:
JACOB HATZEL,
HEYWOOD M. SUMMER.